US011734311B1

(12) United States Patent
Sar et al.

(10) Patent No.: US 11,734,311 B1
(45) Date of Patent: *Aug. 22, 2023

(54) DETERMINING ADDITIONAL FEATURES FOR A TASK ENTRY BASED ON A USER HABIT

(71) Applicant: Google LLC, Mountain View, CA (US)

(72) Inventors: Erwin Can Sar, Mountain View, CA (US); Timothy Youngjin Sohn, Mountain View, CA (US); Andrew Tomkins, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/200,212

(22) Filed: Mar. 12, 2021

Related U.S. Application Data

(63) Continuation of application No. 15/476,261, filed on Mar. 31, 2017, now Pat. No. 10,949,448, which is a continuation of application No. 14/144,852, filed on Dec. 31, 2013, now abandoned.

(51) Int. Cl.
*G06F 16/9032* (2019.01)
*G06F 16/28* (2019.01)
*G06F 16/2455* (2019.01)
*G06F 21/55* (2013.01)

(52) U.S. Cl.
CPC ...... *G06F 16/284* (2019.01); *G06F 16/24565* (2019.01); *G06F 16/90324* (2019.01); *G06F 21/554* (2013.01)

(58) Field of Classification Search
CPC ............. G06F 16/284; G06F 16/24565; G06F 16/9535; G06F 21/554; G06F 16/90324
See application file for complete search history.

(56) References Cited

U.S. PATENT DOCUMENTS

| | | | |
|---|---|---|---|
| 5,603,054 | A | 2/1997 | Theimer et al. |
| 6,842,877 | B2 | 1/2005 | Robarts et al. |
| 7,496,500 | B2 | 2/2009 | Reed et al. |
| 8,055,707 | B2 | 11/2011 | Desai et al. |

(Continued)

OTHER PUBLICATIONS

Corston-Oliver, Simon et al., "Task-Focused Summarization of Email," Microsoft Research Jul. 2004, (http://www1.cs.columbia.edu/~lokesh/pdfs/Corston.pdf), 8 pages. Jul. 1, 2004.

(Continued)

*Primary Examiner* — Marcin R Filipczyk
(74) *Attorney, Agent, or Firm* — Gray Ice Higdon (57) ABSTRACT

Methods and apparatus related to determining additional features for a user task entry of a user based on a user habit of the user. For example, one or more aspects of a user task entry of a user may be compared to one or more aspects of a user habit of the user to determine a correlation measure between the task entry and the user habit. If the correlation measure satisfies a threshold, one or more additional features of the user task entry may be determined based on the user habit. For example, the user habit may include one or more trigger indicators that indicate an actual entry or anticipated entry of the user into the user habit, and one or more of the trigger indicators may be utilized to determine task trigger indicators for the user task entry.

20 Claims, 5 Drawing Sheets

(56) References Cited

U.S. PATENT DOCUMENTS

| | | | |
|---|---|---|---|
| 8,108,206 B2 | 1/2012 | Hufnagel et al. | |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,566,152 B1 | 10/2013 | Shaw et al. | |
| 8,599,801 B2 | 12/2013 | Baio et al. | |
| 8,756,172 B1 | 6/2014 | Radovanovic et al. | |
| 9,628,576 B1 | 4/2017 | Agarwal et al. | |
| 9,766,998 B1 | 9/2017 | Sar et al. | |
| 10,394,684 B1 | 8/2019 | Sar et al. | |
| 10,949,448 B1 | 3/2021 | Sar et al. | |
| 11,016,872 B1 | 5/2021 | Sar et al. | |
| 2006/0168259 A1 | 7/2006 | Spilotro et al. | |
| 2009/0119261 A1 | 5/2009 | Ismalon | |
| 2009/0307212 A1 | 12/2009 | Ramot et al. | |
| 2010/0223212 A1* | 9/2010 | Manolescu | G09B 7/00 706/46 |
| 2011/0055927 A1 | 3/2011 | Hamilton, II et al. | |
| 2011/0289015 A1 | 11/2011 | Mei et al. | |
| 2012/0150532 A1 | 6/2012 | Mirowski et al. | |
| 2012/0239761 A1 | 9/2012 | Linner et al. | |
| 2012/0259851 A1 | 10/2012 | Jia et al. | |
| 2012/0296909 A1 | 11/2012 | Cao et al. | |
| 2012/0317499 A1 | 12/2012 | Shen | |
| 2012/0331036 A1 | 12/2012 | Duan et al. | |
| 2013/0073662 A1 | 3/2013 | Meunier et al. | |
| 2013/0097662 A1 | 4/2013 | Pearcy et al. | |
| 2013/0159270 A1 | 6/2013 | Urmy et al. | |
| 2013/0297551 A1 | 11/2013 | Smith et al. | |
| 2014/0099614 A1* | 4/2014 | Hu | G09B 19/00 434/236 |
| 2014/0200739 A1* | 7/2014 | Kirsch | H04L 67/12 701/1 |
| 2014/0304019 A1 | 10/2014 | Scott | |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87. Jan. 1, 2011.

* cited by examiner

DETERMINING ADDITIONAL FEATURES FOR A TASK ENTRY BASED ON A USER HABIT

BACKGROUND

A user may have interest in creating one or more user task entries related to tasks of the user and the user may utilize one or more applications to create the task entries. For example, a user may have interest in purchasing a product and a user task entry may be created that includes information related to purchasing the product.

SUMMARY

This specification is directed to methods and apparatus related to determining additional features for a user task entry of a user based on a user habit of the user. For example, one or more aspects of a user task entry of a user may be compared to one or more aspects of a user habit of the user to determine a correlation measure between the task entry and the user habit. If the correlation measure satisfies a threshold, one or more additional features of the user task entry may be determined based on the user habit. For example, the user habit may include one or more trigger indicators that indicate an actual entry or anticipated entry of the user into the user habit, and one or more of the trigger indicators may be utilized to determine task trigger indicators for the user task entry.

In some implementations, a method is provided that includes the steps of: identifying a user task entry of a user, the user task entry including an indication of: one or more task actions to be performed by the user and one or more task interaction entities with which the user will interact in performing the one or more task actions; identifying a user habit entry of the user, the user habit entry including an indication of: one or more trigger indicators indicating an actual entry or anticipated entry of the user into the user habit, and one or more of habit actions performed and habit interaction entities interacted with during the user habit; determining a correlation measure between the user task entry and the user habit entry, the correlation measure based on comparing at least one of: the one or more task actions to the habit actions performed, and the one or more task interaction entities to the habit interaction entities; and determining one or more additional features of the user task entry based on the user habit when the correlation measure satisfies a correlation measure threshold.

This method and other implementations of technology disclosed herein may each optionally include one or more of the following features.

The additional features of the user task entry may include one or more task trigger indicators based on the trigger indicators of the user habit entry. The method may further include the steps of: receiving user activity data, the user activity data indicative of one or more of a location of a computing device of the user and user actions via the computing device; determining whether the user activity data is indicative of one or more of the task trigger indicators; and providing, to at least one of the computing device and an additional computing device of the user, information related to the user task entry based on the user activity data being indicative of one or more of the task trigger indicators. In some of those implementations, the method may further include the step of determining one or more completion steps for the user task entry, and wherein the step of providing the information related to the user task entry may include providing the one or more completion steps.

The method may further include the step of: providing, to at least one of the computing device and an additional computing device of the user, information related to the one or more additional features of the user task entry.

The step of determining the correlation measure may include the steps of: comparing the one or more task actions to the habit actions performed; and comparing the one or more task interaction entities to the habit interaction entities.

The one or more task actions to be performed by the user may include a first task action and a second task action, the second task action being an alternative to the first task action; and wherein the one or more additional features of the user task entry may include a selection of one of the first task action and the second task action based on the one or more habit actions of the user habit. The one or more additional features of the user task entry may further include task trigger indicators based on the trigger indicators of the user habit.

The step of determining the correlation measure may include the steps of: determining a task action collection to which the one or more task actions belong and comparing the task action collection to the habit actions performed.

The step of determining the correlation measure may include the step of: determining a task entity collection to which the one or more task interaction entities belong and comparing the task entity collection to the habit actions performed.

The method may further include the step of: modifying the user task entry to include the one or more additional features.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine a correlation measure between a user task entry and a user habit based on comparing one or more aspects of the user task entry to one or more aspects of the user habit. Particular implementations determine one or more additional features for a user task entry based on a user habit when the correlation measure satisfies a threshold. The additional features are new aspects of the user task entry that may be determined for the user task entry as described herein. Particular implementations provide the user with information related to the user task entry. The provided information and/or determining when to provide the user with the information may be based on the additional features of the user task entry that are determined based on the user habit.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

A user may have interest in completing a task and may utilize one or more applications to create a user task entry related to the task. Additionally and/or alternatively, one or more documents or other content associated with a user may indicate an interest of the user in completing a task. One or more components, such as a task system 130 described herein, may create a user task entry for the user, or facilitate creation of a user task entry for the user based on the one or more documents or other content that indicates an interest of the user in completing a task.

A user task entry may include certain information related to the task such as one or more task actions and/or one or more task interaction entities as described herein. The included information may be based on input from the user (e.g., typed, spoken, or other input) and/or the included information may be determined based on one or more documents or other content related to the user task entry (e.g., based on a document utilized to create the task). Utilizing one or more techniques described herein, additional features of the user task entry may be determined based on a user habit entry of the user. For example, a user task entry may be determined to be related to a user habit entry of the user based on a determined correlation measure between the user task entry and the user habit entry. Information from the related user habit entry may then be utilized to determine the additional features for the user task entry. As one example, one or more task trigger indicators for the user task entry may be determined based on one or more trigger indicators that are associated with the user habit entry.

As described herein, a user task entry may include an indication of one or more task actions and an indication of one or more task interaction entities. A task action may be an action that a user has interest in completing and/or having completed by one or more other users. For example, a task action may be "buy" and the user may have interest in buying something and/or having another person buy something for the user. A task interaction entity is an entity that is associated with the task action. For example, a task may have a task action of "buy" and a task interaction entity of "bananas," and the purpose of the task may be for the user to buy bananas.

In some implementations, an indication of the task action and/or the task interaction entity in a task entry may include an entity identifier. For example, an indication of the task action "buy" may include an identifier of the entity associated with the action of buying. An entity identifier may be associated with an entity in one or more databases, such as entity database 150. In some implementations, an indication of the task action and/or the task interaction entity in a task entry may additionally or alternatively include one or more terms associated with the task action and/or the task interaction entity. For example, an indication of the task action "buy" may include the terms "buy" and/or "purchase".

In some implementations, a user task entry may be associated with one or more task completion steps. A task completion step includes one or more completion actions and may include one or more completion objects. For example, a task completion step may be "Travel to the mall," where the completion action is "travel" and the completion object is "mall." In some implementations one or more task completion steps may be determined based on, for example, information that is associated with the user and/or the determined task, information form a related user habit entry, and/or additional information identified from one or more databases. For example, a user may submit a task of "Pay cell phone bill" and a task with a task action of "Pay" and a task interaction entity of "cell phone bill" may be determined based on the submitted task. The cellular phone provider of the user may be identified via additional information that is associated with the user, such as emails of the user, phone contacts of the user, and/or browsing history of the user. Additional information from an email may be utilized to associate a completion step of "Call 555-555-5555" with the task. For example, a billing department phone number of "555-555-5555" may be identified from an email from the identified cellular phone company of the user and utilized to associate a completion step of "Call 555-555-5555" with the user task entry.

In some implementations, information related to a user task entry (e.g., completion steps for a task and/or other information related the task) may be provided to the user. For example, information related to the user task entry may be provided based on one or more task trigger indicators of the task entry, such as task trigger indicators determined based on a related user habit. For example, a user may create a user task entry to "Contact Bob," a completion step of "Call 555-5555" may be determined based on identifying a contact number of "555-5555" for "Bob" in a contacts database of the user, and task trigger indicators may be determined based on a user habit related to the user task entry. The user may be provided with the task completion step of "Call 555-5555" and/or a notification to "Call Bob" based on the one or more task trigger indicators.

Figure 1:
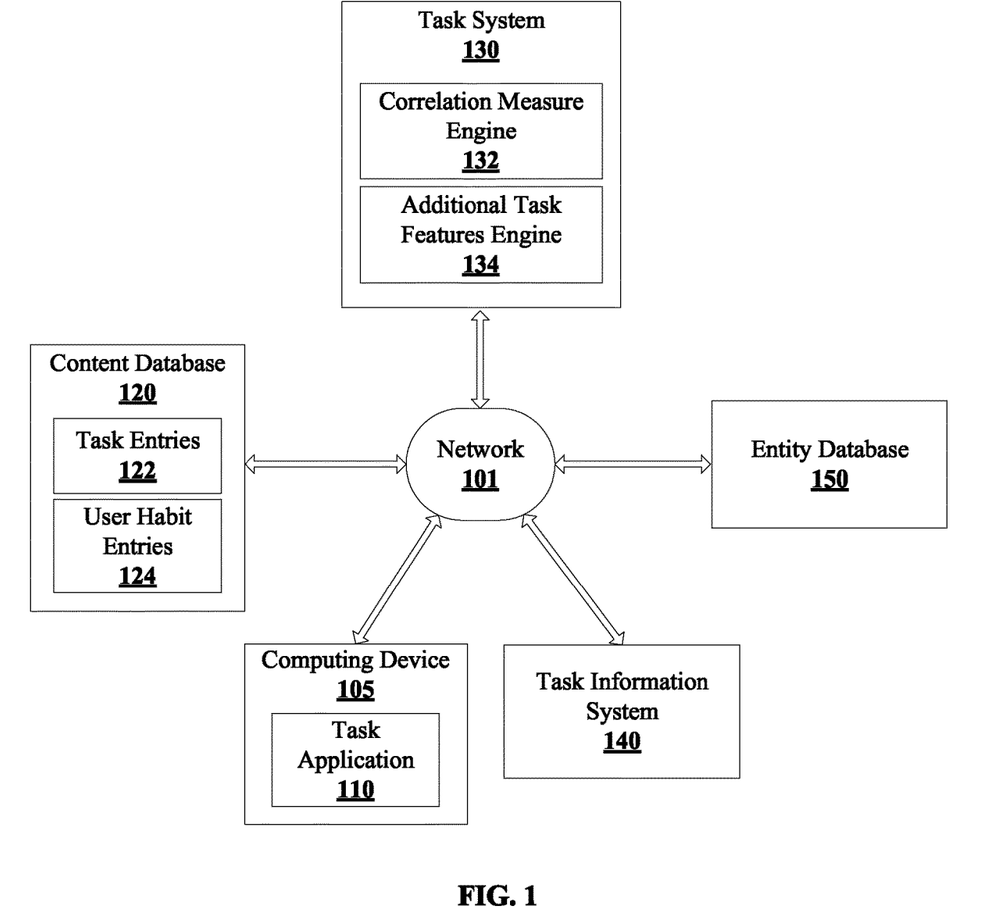
FIG. 1 is a block diagram of an example environment in which additional features for a user task entry may be determined based on a user habit.

Referring to FIG. 1, a block diagram of an example environment is provided in which additional features for a user task entry may be determined based on a user habit. The environment includes a computing device 105 of a user, a content database 120, a task system 130, a task information system 140, and an entity database 150. The environment also includes a communication network 101 that enables communication between various components of the environment. In some implementations the communication network 101 may include the Internet, one or more intranets, and/or one or more bus subsystems. The communication network 101 may optionally utilize one or more standard communications technologies, protocols, and/or inter-process communication techniques.

Figure 9:
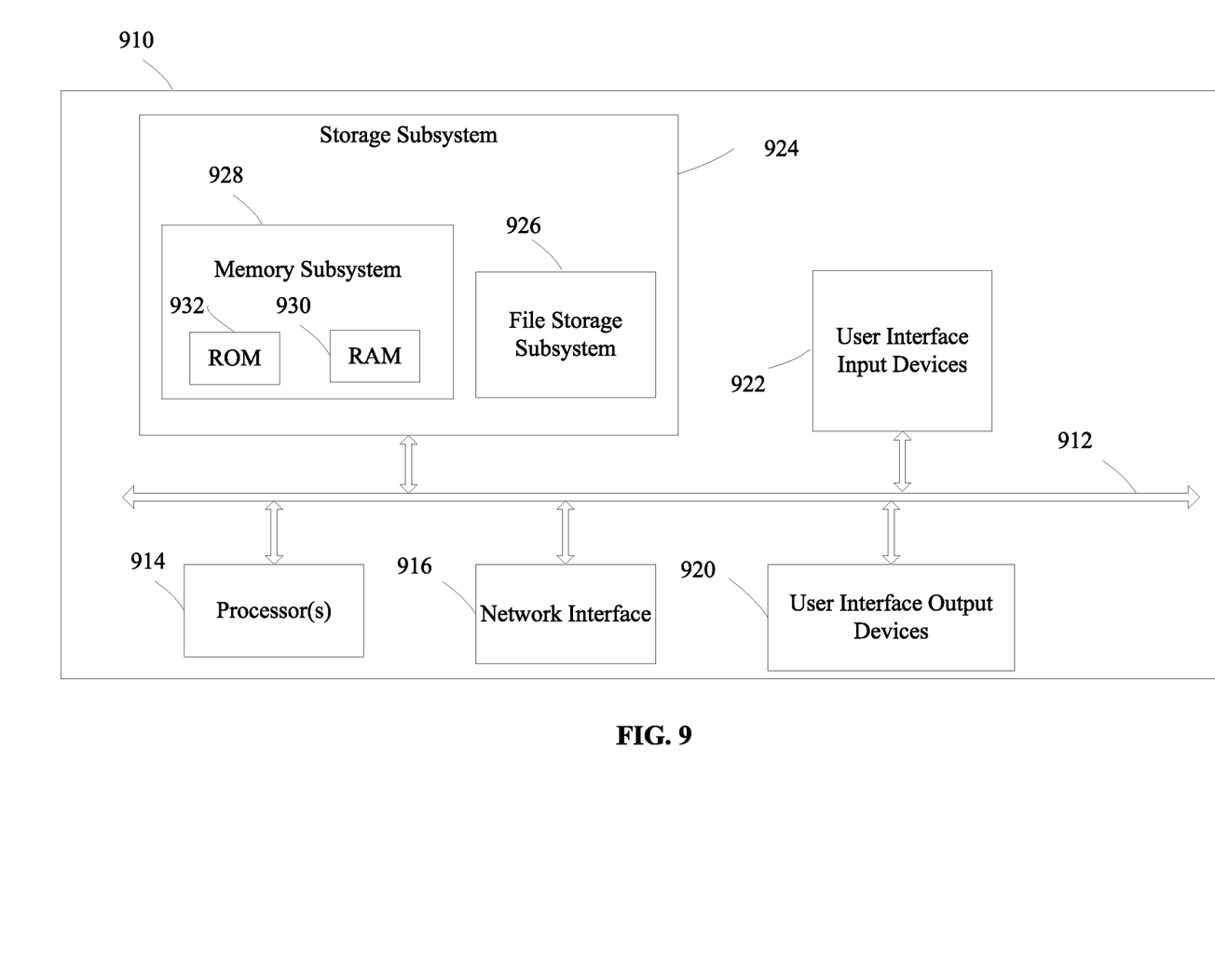
FIG. 9 illustrates a block diagram of an example computer system.

The computing device 105 executes one or more applications and may be, for example, a desktop computer, a laptop computer, a cellular phone, a smartphone, a personal digital assistant (PDA), a tablet computer, a navigation system, a wearable computing device (e.g., glasses, watch, earpiece), or another computing device. The computing device 105 includes memory for storage of data and software applications, a processor for accessing data and executing applications, and components that facilitate communication over the communication network 101. In some implementations, the computing device 105 may include hardware that shares one or more characteristics with the example computer system that is illustrated in FIG. 9. In some implementations, the one or more applications executable by the computing device 105 may include a task application 110.

As discussed herein, user interactions with the computing device 105 and/or one or more additional computing devices associated with the user may optionally be utilized to determine a user task entry of the user, determine user habit entries of the user, and/or provide user activity data of the user. Also, in implementations that provide the user with information related to a user task entry, the information may be provided to the user via the computing device 105 and/or one or more additional computing devices associated with the user. The task application 110 may include one or more applications that enable a user to create a user task entry and/or provide information that may be utilized to determine a user task entry of the user. In some implementations the task application 110 may include, for example, an e-mail application, a calendar application, and/or a web browser executable on computing device 105. In some implementations, the task application 110 may be an application that is dedicated to creating user task entries. For example, a user may intend to create a user task entry and the user may utilize task application 110 to directly submit information to create the intended user task entry.

In some implementations, content database 120 may include one or more storage mediums and may be utilized to store and/or access one or more aspects of information described herein. For example, content database 120 may be utilized by one or more components to store, modify, and/or access user task entries 122 and/or user habit entries 124. In some implementations, the content database 120 may store user task entries 122 and/or user habit entries 124 of multiple users, and, for each entry, access to the entry may be allowed only for the user and/or one or more other users or components authorized by the user such as task system 130 and/or task information system 140. In some other implementations, the content database 120 may only store user task entries 122 and/or user habit entries 124 for a single user.

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. Also, in this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

A user task entry 122 may include certain information related to the task such as one or more task actions and/or one or more task interaction entities. For example, with reference to FIG. 2, an example user task entry 122A includes a task action 1222A of "Fix" and a task interaction entity 1224A of "Faucet".

Figure 2:
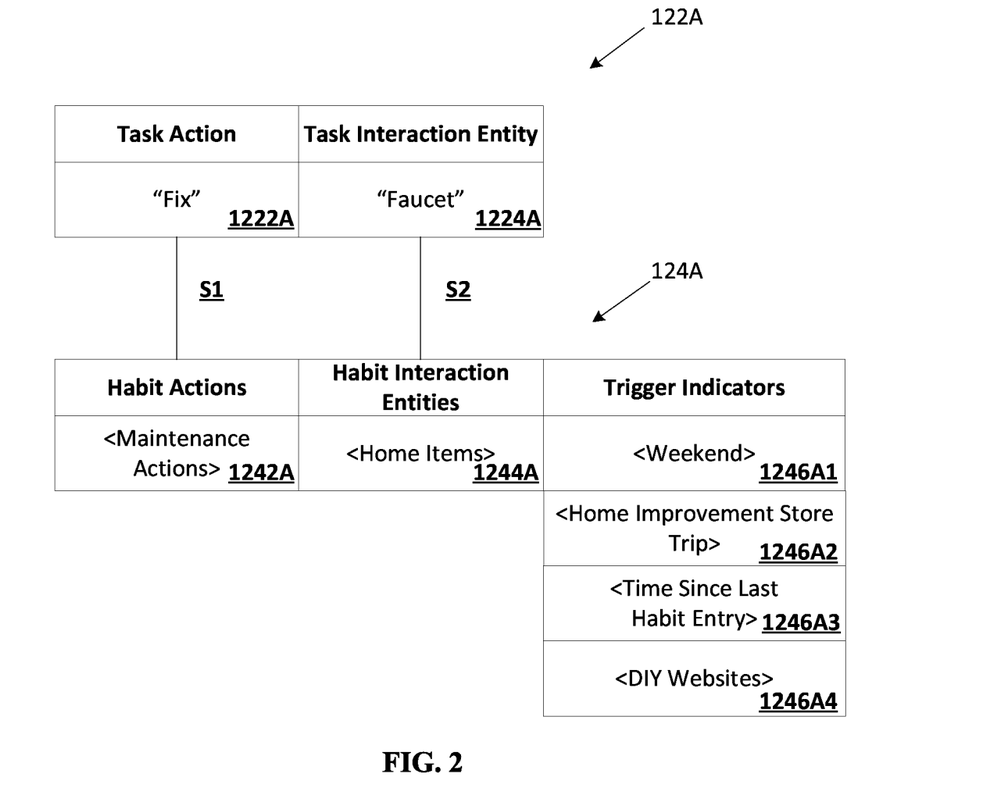
FIG. 2 is a representation of an example user task entry and an example user habit entry.

In some implementations, one or more aspects of the included information of a user task entry may be based on input from the user (e.g., typed, spoken, or other input). For example, the user task entry 122A may be created based on input provided by the user via computing device 105 to create a task entry. For example, the user may input the phrase "fix faucet" via task application 110. Based on the inputted phrase, the task system 130 may determine "fix" is a task action and "faucet" is a task interaction entity. For example, in some implementations the task system 130 may utilize one or more natural language processing techniques to identify the term "fix" is a verb and the term "faucet" is the object of the verb. Also, for example, in some implementations the task system 130 may utilize the entity database 150 to determine that the term "fix" is an alias mapped to an entity associated with a "task action" collection of entities and/or to determine that the term "faucet" is an alias mapped to an entity associated with a "task object" collection of entities.

In some implementations, one or more aspects of the included information of a user task entry may additionally and/or alternatively be based on one or more documents or other content related to the user task entry. For example, the user may submit one or more search queries via the computing device 105 that relate to fixing a faucet and/or view one or more internet documents that relate to fixing a faucet. Based on the search queries and/or viewed internet documents, the task system 130 may determine "fix" is a task action and "faucet" is a task interaction entity that should be associated with the user. For example, in some implementations the task system 130 may receive and/or identify one or more entities associated with the queries and/or internet documents and determine, based on those entities, that the user has interest in completing a task to fix a faucet. For example, each of the queries and documents may be associated with an entity related to "fixing" items and each of the queries and documents may be associated with an entity related to "faucets". The task system 130 may automatically create a user task entry based on such information, or may prompt the user before creating the user task entry.

A user habit entry 124 may include certain information related to a habit of the user such as one or more habit actions, one or more habit interaction entities, and/or one or more habit trigger indicators. A habit action may be one or more actions that a user performs during a habit. For example, a habit action may be "call" for a habit related to a user action of calling, or a habit action may be "contact" for a habit related to user actions of calling, e-mailing, and/or instant messaging. A habit interaction entity is an entity that is associated with the habit action. For example, a habit may have a habit action of "call" and a habit interaction entity of "bob", "contacts", and/or "family members", for a habit related to a user habit of calling one or more individuals.

Habit trigger indicators identify one or more conditions that indicate an actual entry or anticipated entry of the user into the user habit. For example, a habit related to a user habit of calling one or more individuals, may have a habit trigger indicator of the user being located in a vehicle (e.g., as indicated by location data of a computing device of the user and/or pairing of a computing device of the user with a computing device of a vehicle). Also, for example, a habit related to a user habit of calling one or more individuals, may have a habit trigger indicator related to the time since the user last entered the habit. For example, the longer it has been since the user last entered the habit, the more indicative the habit trigger indicator may be of the user entering the user habit. As described herein, one or more trigger indicators may optionally be associated with information indicative of how strongly correlated they are to actual and/or anticipated entry of the user into the user habit. For example, one or more trigger indicators may be identified as required trigger indicators (the habit won't be determined to be entered without the conditions of the trigger indicators being present) and/or one or more trigger indicators may be weighted more heavily than other trigger indicators (e.g., the presence of a more heavily weighted first trigger indicator alone may be more indicative of actual or anticipated entry into the user habit than the presence of a less heavily weighted second trigger indicator alone).

In some implementations, an indication of the habit action, habit interaction entity, and/or habit trigger indicator in a user habit entry may include an entity identifier. For example, an indication of the habit action "buy" may include an identifier of the entity associated with the action of buying. Also, for example, an indication of the trigger indicator of being at a certain location may include an identifier of an entity associated with the location. In some implementations, an indication of the habit action, a habit interaction entity, and/or a habit trigger indicator in a user habit entry may additionally or alternatively include one or more associated more terms and/or other information. For example, an indication of the habit action "buy" may include the terms "buy" and/or "purchase". Also, for example, an indication of the trigger indicator of the user being located in a vehicle may include information related to determining the user is in the vehicle such as an identifier of the computing device of the vehicle, an indicator of user activity data that may indicate the user is in the vehicle, etc.

With reference to FIG. 2, an example user habit entry 124A includes a habit action 1242A of "Maintenance Actions", a habit interaction entity 1244A of "Home Items", and habit trigger indicators 1246A1-A4 of "Weekend", "Home Improvement Store Trip", "Time Since Last Habit Entry", and "DIY Websites". The habit action 1242A of "Maintenance Actions" identifies a collection of action entities that relate to maintenance actions, such as, for example, action entities related to the actions of "fixing", "repairing", "improving", etc. The habit interaction entity 1244A of "Home Items" identifies a collection of interaction entities related to a house such as, for example, interaction entities related to "faucets", "dishwashers", "air conditioners", "furnaces", "doors", etc.

The trigger indicators 1246A1-A4 of "Weekend", "Home Improvement Store Trip", "Time Since Last Habit Entry", and "DIY Websites" identify one or more conditions that indicate an actual entry or anticipated entry of the user into the user habit. For example, the trigger indicator 1246A1 of "Weekend" may identify a condition of it being a weekend day and actual or anticipated entry into the user habit may be more likely to be determined if it is a weekend day. Also, for example, the trigger indicator 1246A2 of "Home Improvement Store Trip" may identify a condition related to determining a trip of the user to one of one or more home improvement stores and actual or anticipated entry into the user habit may be more likely to be determined if the user visits a home improvement store (optionally, either on the weekend or within a predetermined temporal period of the weekend). Also, for example, the trigger indicator 1246A3 of "Time Since Last Habit Entry" may identify a condition related to determining a likelihood the user will enter the user habit based on the time since the user last entered the habit of the user habit entry. For example, actual or anticipated entry into the user habit may be more likely to be determined the longer it has been since the user last entered the habit of the user habit entry. Also, for example, the trigger indicator 1246A4 of "DIY Websites" may identify a condition related to determining visits by the user to one of one or more do it yourself websites (optionally, either on the weekend or within a predetermined temporal period of the weekend).

In some implementations, one or more aspects of the included information of a user habit entry may be based on input from the user. For example, the user habit entry 122A may be created based on input provided by the user via computing device 105 to define a user habit. For example, the user may input or select, via task application 110 and/or other application, the collection of habit actions "maintenance actions" as an action of the habit and the collection of habit interaction entities of "home items" as a habit interaction entity of the habit. Also, for example, the user may input or select, via task application 110 and/or other application, the habit action of "fix" and, based on the term "fix", the task system 130 may utilize the entity database 150 to determine that the term "fix" is an alias mapped to an entity associated with a "maintenance actions" collection of entities and/or mapped to entities associated with other maintenance actions (e.g. repair, improve). The task system 130 may associate such mapped entities with the user habit. Also, for example, the user may input or select, via task application 110 and/or other application, trigger indicators to associate with inputted or selected habit actions and habit interaction entities. For example, the user may input that a trigger indicator of pairing of the mobile phone of the user with a vehicle of the user is a required trigger indicator for the user habit.

In some implementations, one or more aspects of the included information of a user habit entry may additionally and/or alternatively be based on one or more determinations by the task system 130 and/or other component based on data associated with the user. For example, the task system 130 may utilize location data associated with the user and/or documents or other content associated with the user to determine one or more user habits of the user and create user habit entries related to determined user habits. For example, location data and/or other content associated with the user may indicate repeated user performance of one or more habit actions and/or interaction with one or more habit interaction entities in combination with the same or similar habit trigger indicators. Based on such repeated user performance and interaction in combination with same or similar trigger indicators, the task system 130 may create a user habit entry. The task system 130 may automatically create a user habit entry based on such information, or may prompt the user before creating the user habit entry.

The task system 130 may determine additional features of a user task entry based on a user habit of the user. For example, the correlation measure engine 132 may determine a correlation measure between the user task entry and a user habit entry of the user and the task system 130 may determine a user task entry is related to a user habit based on the correlation measure. For example, the task system 130 may determine a user task entry is related to a user habit entry if the correlation measure between the two satisfies a threshold. The additional task features engine 134 of the task system 130 may utilize information from the related user habit to determine one or more additional features for the user task entry. As one example, one or more task trigger indicators for the user task entry may be determined based on one or more trigger indicators that are associated with the user habit entry. For example, one or more of the trigger indicators that are associated with the user habit may be mapped to the user task entry and/or one or more trigger indicators for the user habit entry may be used to determine new trigger indicators for the user task entry that are based on, but not the same as, the trigger indicators of the user habit entry. In some implementations, one or more task trigger indicators for the user task entry that are determined based on one or more trigger indicators that are associated with the user habit entry may supplement one or more task trigger indicators already associated with the user task entry.

Referring again to FIG. 2, an example of correlation measures between the user task entry 122A and the user habit entry 124A is described. The correlation measure engine 132 may determine the correlation measure based on a first similarity score S1 between the task action 1222A and the habit actions 1242A, and a second similarity score S2 between the task interaction entity 1224A and the habit interaction entities 1244A. For example, the correlation measure engine 130 may determine the first similarity score S1 based on one or more measures of similarity between the task action 1222A of "Fix" and the habit actions 1242A of "Maintenance Actions". Also, for example, the correlation measure engine 132 may determine the second similarity score S2 based on one or more measures of similarity between the task interaction entity 1224A of "Faucet" and the habit interaction entities 1244A of "Home Items". One or more techniques may be utilized to determine the correlation measure based on the first similarity score S1 and the second similarity score S2. For example, a weighted and/or unweighted average of the similarity scores S1 and S2 may be utilized. Also, for example, a sum of the similarity scores S1 and S2 may additionally and/or alternatively be utilized.

In some implementations, the similarity scores S1 and S2 may be, for example, a number (e.g., numbers from 0 to 1), the magnitude of which is indicative of the degree of similarity. For example, 0.8 may be indicative of a higher degree of similarity than 0.5. In some implementations, the similarity scores may be a true/false value (e.g., a 0 or a 1), with the true value indicating at least a threshold level of similarity and the false value indicating a lack of at least a threshold level of similarity.

One or more techniques may be utilized to determine the similarity scores S1 and S2. For example, the correlation measure engine 132 may utilize entity database 150 to determine that the task action 1222A of "Fix" is a member of the collection of habit actions "Maintenance Actions" 1242A. For example, the entity database 150 may include a mapping (e.g., data defining an association) between entities and one or more attributes and/or other related entities. For example, the task action 1222A of "Fix" may be mapped in the entity database 150 as a member of the collection of habit actions "Maintenance Actions" 1242A. Based on the mapping, and optionally a weighting of the indicated mapping (e.g., as indicated by metadata associated with the mapping), the similarity score S1 may be determined. Also, for example, the task interaction entity 1224A of "Faucet" may be mapped in the entity database 150 as a member of the collection of habit interaction entities "Home Items" 1244A. Based on the mapping, and optionally a weighting of the indicated mapping, the similarity score S2 may be determined.

The additional task features engine 134 of the task system 130 may utilize information from the user habit 124A to determine one or more additional features for the user task entry 122A when the correlation measure determined by the correlation measure engine 132 satisfies a threshold. For example, one or more task trigger indicators for the user task entry 122A may be determined based on one or more of the trigger indicators 1246A1-A3. For example, a pointer to one or more of the trigger indicators 1246A1-A4 may be added to the user task entry 122A to add the trigger indicators 1246A1-A4 to the user task entry 122A. Also, for example, one or more of the trigger indicators 1246A1-A4 may be utilized to determine a more particularized trigger indicator for the user task entry 122A. For example, the trigger indicator 1246A1 of "Weekend" may identify a condition of it being a weekend day and, based on the trigger indicator 1246A1, the additional task features system 134 may determine the next upcoming weekend day as a trigger indicator of the user task entry 122A. Also, for example, the trigger indicator 1246A4 of "DIY Websites" may identify a condition related to determining visits by the user to one of one or more do it yourself websites and, based on the trigger indicator 1246A4 and the task interaction entity 1224A "Faucet", the additional task features system 134 may determine a visit to a webpage of a do it yourself website, wherein the webpage includes the term "faucet", as a trigger indicator of the user task entry 122A.

In some implementations, a user habit entry may include multiple habit actions, multiple habit interaction entities, and/or multiple trigger indicators. In some of those implementations, weightings may optionally be associated with one or more of the multiple habit actions, interaction entities, and/or trigger indicators. Each weighting may be generally indicative of the strength of the association of the respective item to the user habit entry. The weightings may be utilized, for example, in determining a correlation measure between the user task entry and the user habit entry, determining which information of a related user habit entry to associate with a task entry, and/or in determining how to weight determined information for the user task entry.

Figure 3:
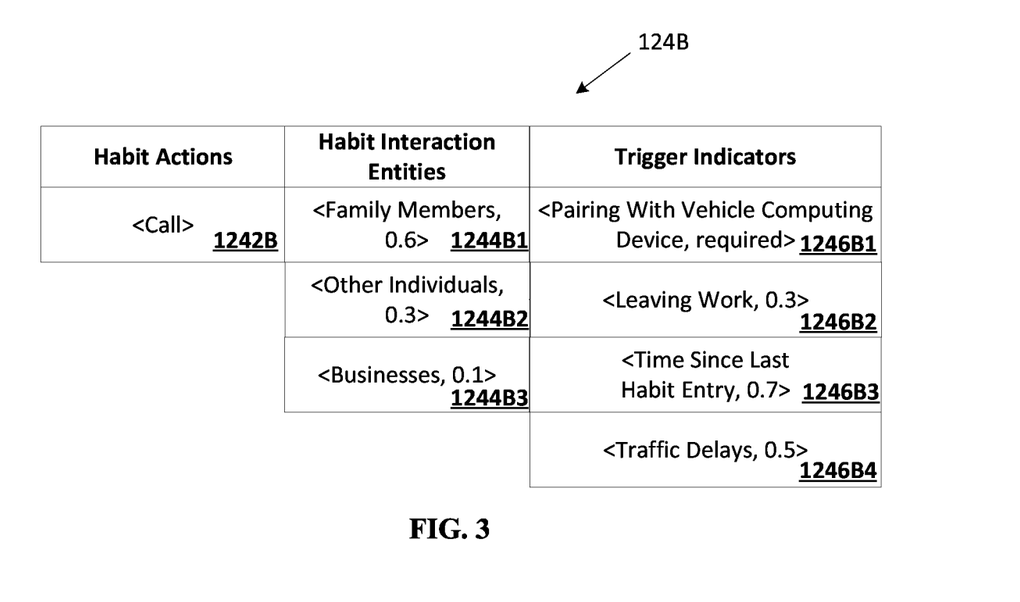
FIG. 3 is a representation of an additional example user habit entry.

For example, with reference to FIG. 3, a representation of an additional example user habit entry 124B includes multiple habit interaction entities 1244B1-B3 and multiple trigger indicators 1246B1-B4. The habit entry 124B also includes a single habit action 1242B. Each of the habit interaction entities 1224B1-B3 and trigger indicators 1246B1-B4 includes an associated weighting. For example, the "Family Members" habit interaction entity 1244B1 includes an associated weighting of 0.6. Also, for example, the "Pairing With Vehicle Computing Device" trigger indicator 1246B1 includes an associated weighting of "required", indicating the condition associated with the trigger indicator must be present to indicate actual or anticipated entry into the user habit. In FIG. 3, greater in value numerical weightings represent stronger associations to the user habit 124B than lesser in value numerical weightings. For example, the "Family Members" habit interaction entity 1244B1 (weighting of 0.6) is more strongly associated with the user habit 124B than the "Other Individuals" habit interaction entity 1244B2 (weighting of 0.3).

In some implementations, the weightings of one or more of the habit interaction entities 1244B1-B3 and/or multiple trigger indicators 1246B1-B4 may be utilized in determining correlation measures. For example, for a user task entry having a task action of "call" and a task interaction entity of "mom", the correlation measure engine 132 may determine a correlation measure based on a similarity score between the task action of "call" and the user habit action 1242B of "call" and based on a similarity score between the task interaction entity of "mom" and the habit interaction entities

1224B1-B3. For example, the user task interaction entity of "mom" may be determined to be a family member (e.g., based on contacts of the user), and determined to be similar to the user habit interaction entity 1224B1 of "Family Members", but not similar to the other user habit interaction entities 1244B2-B3. Due to the relatively high weighting (0.6) of the user habit interaction entity 1244B3 of "Family Members", the similarity score between the task interaction entity of "mom" and the habit interaction entities 1224B1-B3 may be indicative of a strong level of similarity.

As another example, for a user task entry having a task action of "call" and a task interaction entity of "Restaurant 1", the correlation measure engine 132 may determine a correlation measure based on a similarity score between the task action of "call" and the user habit action 1242B of "call" and based on a similarity score between the task interaction entity of "Restaurant 1" and the habit interaction entities 1224B1-B3. For example, the user task interaction entity of "Restaurant 1" may be determined to be a business (e.g., based on a mapping in entity database 150), and determined to be similar to the user habit interaction entity 1224B3 of "Businesses", but not similar to the other user habit interaction entities 1244B1-B2. Due to the relatively low weighting (0.1) of the user habit interaction entity 1244B3 of "Businesses", the similarity score between the task interaction entity of "Restaurant 1" and the habit interaction entities 1224B1-B3 may be indicative of a low level of similarity. For example, the low level of similarity may prevent the correlation measure from satisfying a threshold and prevent the user habit entry 124B from being associated with the user task entry.

As yet another example, for a user task entry having a task trigger indicator of "on my way home from work", the correlation measure engine 132 may determine a correlation measure based at least in part on a similarity score between the task trigger indicator of "on my way home from work" and the task trigger indicators 1224B1-B4. For example, the task trigger indicator of "on my way home from work" may be determined to be similar to the user habit trigger indicator 1246B2 of "Leaving Work" (e.g., based on natural language processing techniques to determine similarity), but not similar to the other user habit trigger indicators 1246B1, B3, and B4. Accordingly, the weighting of 0.3 associated with the user habit trigger indicator 1246B2 may be utilized in determining the similarity score.

Also, as described, in some implementations one or more weightings associated with information of a user habit entry may be utilized in determining which information of the user habit entry to utilize in determining additional features of a related user task entry. For example, the additional task features engine 134 may determine which of habit trigger indicators 1246B1-B4 is utilized in determining one or more task trigger indicators for an associated user task entry based on the weightings of the habit trigger indicators 1246B1-B4. For example, an additional feature of the user task entry may be determined to be a task trigger indicator that maps directly to the habit trigger indicator 1246B1 based on the habit trigger indicator 1246B1 being associated with a "required" weighting. Also, for example, user habit trigger indicator 1246B2 "Leaving Work" may not be utilized as a task trigger indicator for the user task entry and/or may be assigned a lower weighting (e.g., the same or similar weighting as in the user habit entry 124B) for the user task entry based on its relatively low weighting in the user habit entry 124B.

Figure 4:
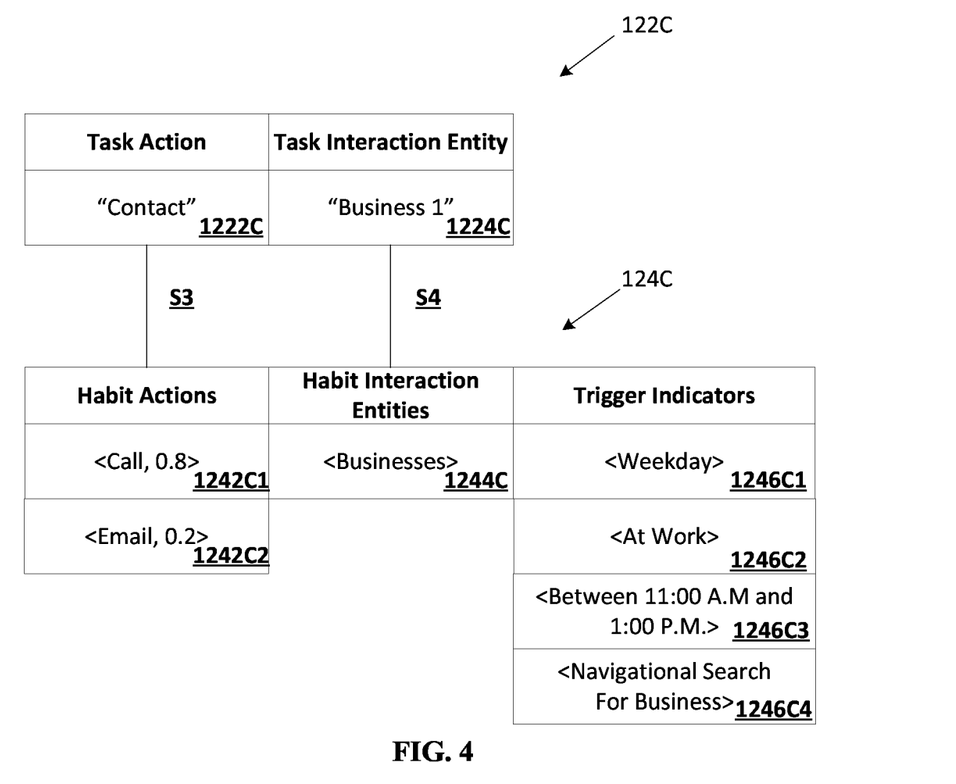
FIG. 4 is a representation of an additional example user task entry and an additional example user habit entry.

As yet another example, with reference to FIG. 4, a user task entry 122C may be determined to have a correlation measure relative to a user habit entry 124C that satisfies a correlation measure threshold. For example, the correlation measure engine 132 may determine the correlation measure based on similarity measure S3 between task action 1222C and habit actions 1242C1 and/or 1242C2 and/or based on similarity measure S4 between task interaction entity 1224C and habit interaction entities 1244C. For example, task action 1222C of "contact" identifies a collection of task actions such as, for example, "call", "email", "text", "contact via social media", etc. Task action 1222C may be determined to have a high degree of similarity to habit actions 1242C1 and C2 based on the habit actions 1242C1 and C2 being members of the collection identified by task action 1222C.

In some implementations, the one or more additional features determined for the user task entry 122C based on the user habit entry 124C may include weighting and/or selecting one or more of the members of the collection of task actions identified by the task action 1222C of "contact". For example, based on the habit actions 1242C1 and C2 of "call" and "email" being the only habit actions listed in user habit entry 124C, the additional task features engine 134 may select "call" and "email" as the task actions for the user task entry 122C (while not selecting other task actions such as "text"). Also, for example, based on the habit actions 1242C1 and C2 of "call" and "email" being the only habit actions listed in user habit entry 124C, the additional task features engine 134 may weight "call" and "email" more heavily (e.g., based on their weightings in the user habit entry 124C) as task actions for the user task entry 122C (while weighting less heavily other task actions identified by "contact" such as "text"). Also, for example, based on the habit action 1242C1 of "call" being associated with a weighting (0.8) that is greater than the weighting (0.2) of "email", the additional task features engine 134 may select "call" as the only task action for the user task entry 122C (while not selecting other task actions of the "contact" collection). In some implementations, one member of a collection of task actions may be selected to the exclusion of any other members when the weighting of that member in the user habit entry satisfies a threshold, such as a threshold relative to one or more other weightings in the user habit entry associated with other members.

In some implementations, weightings may be provided between information of a user habit entry and utilized in determining which information of the user habit entry to utilize in determining additional features of a related user task entry. The weighting between two or more pieces of information of a user habit entry is indicative of a strength of correlation between such pieces of information. The weighting between information of a user habit entry may be in addition to, or as an alternative to weightings associated with the information itself. For example, with reference to FIG. 4, weightings may be provided between each of the trigger indicators 1246C1-C4. For example, trigger indicator 1246C1 may have a weighting with respect to trigger indicator 1246C2 that indicates those two trigger indicators have a high degree of correlation to one another (e.g., the trigger indicators often both occur together in relation to the user habit). Based on such high degree of correlation, the additional features task engine 134 may determine one or more trigger indicators for the user habit entry based on both of the trigger indicators 1246C1 and C2, and not determine trigger indicators based on just one of the trigger indicators 1246C1 and C2.

As another example, with continuing reference to FIG. 4, habit action 1242C1 of "Call" may have a strong weighting to trigger indicators 1246C1-C3, but a weaker weighting to trigger indicator 1246C4. Based on such weightings, in some implementations in which the additional task features engine 134 weights "call" more heavily and/or selects "call" as the only task action for the user task entry 122C based on the user habit entry 124C, the additional task features engine 134 may determine one or more task trigger indicators for the user task entry 122C based more strongly on, or exclusively on, trigger indicators 1246C1-C3.

In some implementations, task system 130 may determine one or more task completion steps to associate with a task. In some implementations, the task system 130 may determine a task completion step based on information that is associated with a task. For example, the task system 130 may identify a task of "Buy bananas" and determine that a task completion step of "Go to the grocery store" may be an appropriate task completion step for the task based on identifying an association between "Buy bananas" and a completion step of going to a grocery store. In some implementations, task system 130 may determine a task completion step for a task based on identifying associations between one or more task actions and/or interaction entities of a task and the task completion step in one or more database, such as entity database 150. In some implementations, task system 130 may determine a task completion step for a task based on a related user habit entry. For example, where multiple independent sets of potential task completion steps are determined for a task, one of the sets may be selected or weighted more heavily based on similarity between the set and one or more aspects of a related user habit entry. For example, the sole task completion step of a set may be "go to the home improvement store" and may have a high degree of similarity with a trigger indicator of "home improvement store trip" of a related user habit entry based on, for example, similarity of terms and/or entities referenced by each. Based on the high degree of similarity, the set may be selected for association with the user task entry.

In some implementations, task information system 140 may provide information related to a user task entry to a user based on one or more trigger indicators associated with the user task entry, such as one or more task trigger indicators determined based on a related user habit entry. The indication provided to the user may include, for example, a reminder related to the user task entry (e.g., a notification in the task application 110, a popup via the computing device 110, highlighting of the task entry in the task application) and/or one or more completion steps associated with the task entry.

Generally, the task trigger indicators identify one or more conditions that indicate it may be desirable to provide information to the user that is related to the user task entry. The task trigger indictors may be compared to received user activity data and/or other data to determine if the received user activity data and/or other data is indicative of one or more of the task trigger indicators. When the data is indicative of a threshold number (e.g., one, two, or all) of the task trigger indicators, the indication related to the user task entry may be provided.

Received user activity data is indicative of one or more of a location of a computing device of the user and/or user actions via the computing device. For example, received user activity data may include data indicative of a location of the computing device 105 such as data based on GPS, Wi-Fi, and/or cellular tower indicated locations of the computing device 105. Also, for example, received user activity data may include data indicative of search queries submitted via the computing device 105 (e.g., queries local to the computing device 105 and/or submitted to a search engine), documents visited via the computing device 105 (e.g., documents local to the computing device 105 and/or accessed via the Internet), entities contacted via the computing device 105 (e.g., e-mailed, called, instant messaged), applications executed via the computing device, etc. Received user activity data may be provided directly by the computing device 105 and/or by another component with which the computing device 105 communicates (e.g., a search system to which the computing device 105 submitted a search query).

As one example, with reference to FIG. 4, task trigger indicators may be determined for the user task entry 122C based on the trigger indicators 1246C1-C4 of the related habit entry 124C. For example, in some implementations the trigger indicators 1246C1-C4 may be utilized as the task trigger indicators. The trigger indicator 1246C1 of "Weekday" may identify a condition of it being a week day and information related to the user task entry may be more likely to be provided if it is a week day. Also, for example, the trigger indicator 1246C2 of "At Work" may identify a condition related to determining the user is likely at work (e.g., based on location data of a computing device of the user, user access of a work computing device) and information related to the user task entry may be more likely to be provided if the user is at work. Also, for example, the trigger indicator 1246C3 of "Between 11:00 A.M. and 1:00 P.M." may identify a condition related to it being between the hours of 11:00 A.M. and 1:00 P.M. and information related to the user task entry may be more likely to be provided if it is between those hours. Also, for example, the trigger indicator 1246C4 of "Navigational Search" may identify a condition related to determining one or more search queries issued by the user that are navigational search queries (e.g., those seeking a particular website) related to a business entity and information related to the user task entry may be more likely to be provided if such navigational search queries are issued. As described herein, one or more trigger indicators may optionally be tied to one another. For example, trigger indicators 1246C2 and/or 1246C4 may optionally be tied to temporal indicators 1246C1 and/or 1246C3. For example, the trigger indicator 1246C4 of "Navigational Search" may identify a condition related to determining one or more search queries issued by the user on a weekday and/or between 11:00 A.M. and 1:00 P.M. that are navigational search queries related to a business entity.

Task information system 140 may provide information related to the user task entry 122C when the conditions associated with one or more task trigger indicators have been satisfied. For example, continuing with the previous example, task information system 140 may provide information related to the user task entry 122C when all of the conditions associated with one or more task trigger indicators have been satisfied. For example, if it is a weekday between the hours of 11:00 A.M. and 1:00 P.M., and user activity data indicates the user is at work and has issued a navigational search related to a business entity, information related to the user task entry 122C may be provided.

In some implementations, the task information system 140 may provide information related to the user task entry 122C when the conditions associated with less than all of the trigger indicators have been satisfied. For example, as described herein, in some implementations one or more of the task trigger indicators may be indicated as required and/or have one or more weightings associated therewith. For example, the task trigger indicator corresponding to trigger indicator 1246C2 may be "required", the task trigger indicators corresponding to trigger indicators 1246C1 and 1246C3 may have a first weighting, and the task trigger indicator corresponding to trigger indicators 1246C4 may have a second weighting that is greater than the first weighting. In some implementations of such an example, information may be provided when conditions are satisfied for the task trigger indicator corresponding to trigger indicator 1246C2 and are satisfied for either: the task trigger indicator corresponding to trigger indicator 1246C4 standing alone; and/or the task trigger indicators corresponding to trigger indicators 1246C1 and 1246C3.

Figure 7:
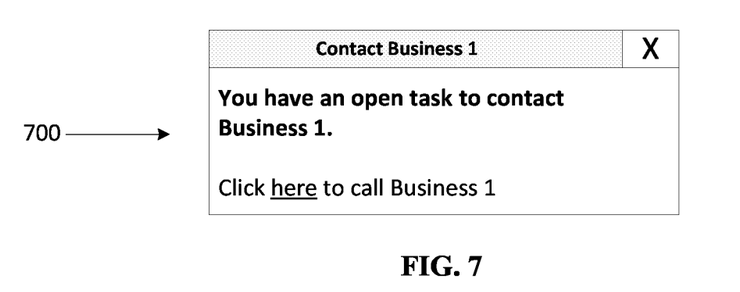
FIG. 7 is an example of information related to a user task entry of the user that may be provided to a user.

FIG. 7 is an example of information related to a user task entry of a user that may be provided to the user when the conditions associated with one or more task trigger indicators have been satisfied (e.g., as described in the immediately preceding examples). The information is presented in a display 700 that may be displayed on computing device 105. For example, the task information system 140 may provide information related to the information and/or the display to computing device 105 to enable computing device 105 to display the information to the user in display 700. The display 700 includes the text "Contact Business 1" and "You have an open task to contact Business 1", which includes information based on the user task entry 122C (based on task action 1222C and task interaction entity 1224C). The display 700 also includes the text "Click here to call Business 1", which also includes information based on the user task entry 122C. For example, the task action of "call" may be selected as a preferred task action member of the collection of task actions identified by "contact" task action 1222C based on the weighting of habit action 1242C1 as described herein. Also, for example, the text "Click here to call Business 1" may be identified based on an optional completion step that may be associated with the user task entry and optionally selected based on the weighting of habit action 1242C1 as described herein. The text "Click here to call Business 1" includes selectable text "here" that may be selected by a user to assist in calling Business 1 (e.g., selection may auto populate the number for Business 1 in a phone dialing application and/or auto dial the number for Business 1). The phone number for Business 1 may be identified, for example, based on a mapping of "Business 1" to a phone number in entity database 150.

Figure 8:
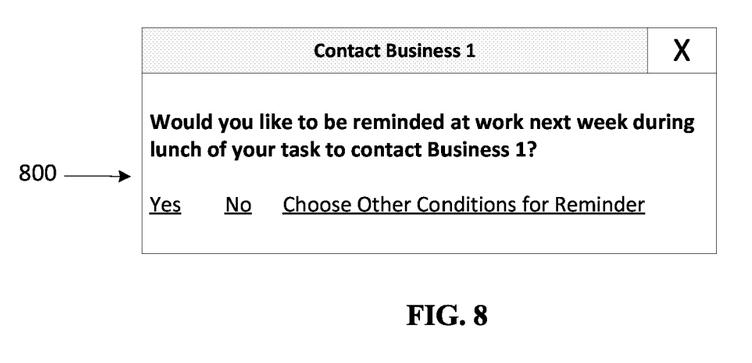
FIG. 8 is another example of information related to a user task entry of the user that may be provided to a user.

FIG. 8 is another example of information related to a user task entry of the user that may be provided to a user. The information may be provided to the user, for example, after the user task entry 122C has been created and related to the user habit entry 124C. The provided information enables the user to confirm or modify task trigger indicators determined for the user task entry based on the user habit entry 124C. The information is presented in a display 800 that may be displayed on computing device 105. For example, the task information system 140 may provide information related to the information and/or the display to computing device 105 to enable computing device 105 to display the information to the user in display 800. The display 800 includes the text "Contact Business 1" and "Would you like to be reminded at work next week during lunch of your task to contact Business 1", which includes information based on the user task entry 122C, including information related to the task trigger indicators determined based on the trigger indicators 1246C1-C.

For example, "at work" may be identified based on a task trigger indicator corresponding to trigger indicator 1246C2. Also, for example, "next week" may be identified based on a task trigger indicator corresponding to trigger indicator 1246C1. Also, for example, "during lunch" may be identified based on a task trigger indicator corresponding to trigger indicator 1246C3. The display 800 presents the user with the option to select "yes" to affirmatively set the task trigger indicators determined for the user task entry 122C, or to select "No" to affirmatively not set the determined task trigger indicators. The display 800 also presents the user with the option to "Choose Other Conditions for Reminder", which may be selected by the user to enable the user to set alternative task trigger indicators.

Additional and/or alternative information related to a user task entry may be provided, and may be provided with alternative display parameters than those illustrated in the examples of FIG. 7 and FIG. 8.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

The task system 130, the task information system 140, and/or one or more additional components of the example environment of FIG. 1 may each include memory for storage of data and software applications, a processor for accessing data and executing applications, and components that facilitate communication over a network. In some implementations, the task system 130 and the task information system 140 may include hardware that shares one or more characteristics with the example computer system that is illustrated in FIG. 9. The operations performed by one or more components of the example environment may optionally be distributed across multiple computer systems. For example, the steps performed by task system 130 may be performed via one or more computer programs running on one or more servers in one or more locations that are coupled to each other through a network.

Figure 5:
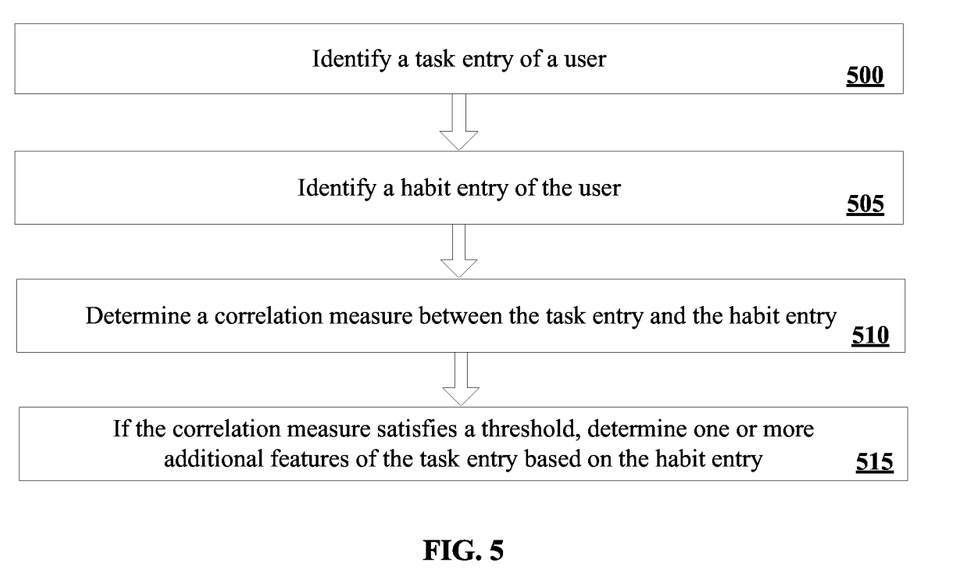
FIG. 5 is a flow chart illustrating an example method of determining additional features for a user task entry based on a user habit.

Referring to FIG. 5, a flow chart is illustrated of an example method of determining additional features for a user task entry based on a user habit. Other implementations may perform the steps in a different order, omit certain steps, and/or perform different and/or additional steps than those illustrated in FIG. 5. For convenience, aspects of FIG. 5 will be described with reference to one or more components of FIG. 1 that may perform the method such as the task system 130.

At step 500, a task entry of a user is identified. In some implementations, the user task entry is identified from content database 120 by a component that shares one or more characteristics with task system 130. The user task entry includes certain information related to a task such as one or more task actions and/or task interaction entities. For example, with reference to FIG. 2, an example user task entry 122A includes a task action 1222A of "Fix" and a task interaction entity 1224A of "Faucet". As described herein, one or more aspects of the included information of a user task entry may be based on input from the user and/or may be based on one or more documents or other content associated with the user.

At step 505, a habit entry of the user is identified. In some implementations, the user habit entry is identified from content database 120 by a component that shares one or more characteristics with task system 130. The user habit entry includes certain information related to a habit of the user such as one or more habit actions, habit interaction entities, and/or habit trigger indicators. For example, with reference to FIG. 2, an example user habit entry 124A includes habit actions 1242A of "Maintenance Actions" habit interaction entities 1244A of "Home Items", and trigger indicators 1246A1-A4 of "Weekend", "Home Improvement Store Trip", "Time Since Last Habit Entry", and "DIY Websites". The habit action 1242A of "Maintenance Actions" identifies a collection of action entities that relate to maintenance actions, such as, for example, action entities related to the actions of "fixing", "repairing", "improving", etc. The habit interaction entity 1244A of "Home Items" identifies a collection of interaction entities related to a house such as, for example, interaction entities related to "faucets", "dishwashers", "air conditioners", "furnaces", "doors", etc.

As described herein, one or more aspects of the included information of a user habit entry may be based on input from the user and/or may be based on one or more determinations by the task system 130 and/or other component based on data associated with a user. In some implementations, the user habit entry indicates repeated user performance of one or more habit actions and/or interaction with one or more habit interaction entities in combination with the same or similar trigger indicators. In some of those implementations, the repeated user performance of one or more habit actions may be repeated performance of related habit actions such as repeated performance of habit actions that are all members of a habit action collection. Also, in some of those implementations, the repeated user interaction with one or more habit interaction entities may be repeated interaction with related habit interaction entities such as repeated interaction with habit interaction entities that are all members of a habit interaction entity collection. Accordingly, the user habit entry may indicate a grouping of related (but one or more being distinct), past user actions and/or user interaction entities based on data associated with a user such as past user task entries of the user and/or past user activity data of the user.

At step 510, a correlation measure between the task entry and the user habit entry is determined. In some implementations, the correlation measure engine 132 of the task system 130 determines the correlation measure. In some implementations, the correlation measure may be determined based on one or more similarity scores between one or more task actions of the user task entry and one or more habit actions of the user habit entry. In some implementations, the correlation measure may additionally and/or alternatively be determined based on one or more similarity scores between one or more task interaction entities of the user task entry and one or more habit interaction entities of the user habit entry. In some implementations, the correlation measure may additionally and/or alternatively be determined based on one or more similarity scores between other information of the user task entry and the user habit entry such as task trigger indicators of the user task entry and trigger indicators of the user habit entry.

As one example, the correlation measure engine 132 may determine the correlation measure based on a first similarity score S1 between the task action 1222A and the habit actions 1242A, and a second similarity score S2 between the task interaction entity 1224A and the habit interaction entities 1244A. For example, the correlation measure engine 130 may determine the first similarity score S1 based on one or more measures of similarity between the task action 1222A and the habit actions 1242A and may determine the second similarity score S2 based on one or more measures of similarity between the task interaction entity 1224A and the habit interaction entities 1244A. One or more techniques may be utilized to determine the correlation measure based on the first similarity score S1 and the second similarity score S2.

At step 515, one or more additional features of the user task entry are determined based on the user habit entry if the correlation measure satisfies a threshold. In some implementations, the task system 130 may determine a user task entry is related to a user habit entry if the correlation measure between the two satisfies a threshold. In some implementations, the additional task features engine 134 of the task system 130 may utilize information from the related user habit entry to determine one or more additional features for the user task entry. The determined additional features of the user task entry may be associated with the user task entry. For example, a user task entry in content database 120 may be modified to include an identifier or other information item related to determined additional features.

As one example, one or more task trigger indicators for the user task entry 122A may be determined based on one or more of the trigger indicators 1246A1-A3. For example, a pointer to one or more of the trigger indicators 1246A1-A4 may be added to the user task entry 122A to add the trigger indicators 1246A1-A4 to the user task entry 122A. Also, for example, one or more of the trigger indicators 1246A1-A4 may be utilized to determine a more particularized trigger indicator for the user task entry 122A. For example, the trigger indicator 1246A1 of "Weekend" may identify a condition of it being a weekend day and, based on the trigger indicator 1246A1, the additional task features system 134 may determine the next upcoming weekend day as a trigger indicator of the user task entry 122A. Also, for example, the trigger indicator 1246A4 of "DIY Websites" may identify a condition related to determining visits by the user to one of one or more do it yourself websites and, based on the trigger indicator 1246A4 and the task interaction entity 1224A "Faucet", the additional task features system 134 may determine a visit to a webpage of a do it yourself website, wherein the webpage includes the term "faucet", as a trigger indicator of the user task entry 122A.

In some implementations, a user habit entry may include multiple habit actions, multiple habit interaction entities, and/or multiple trigger indicators. In some of those implementations, weightings may optionally be associated with one or more of the multiple habit actions, interaction entities, and/or trigger indicators. Each weighting may be generally indicative of the strength of the association of the respective item to the user habit entry. The weightings may be utilized, for example, in determining a correlation measure between the user task entry and the user habit entry, determining which information of a related user habit entry to associate with a task entry, and/or in determining how to weight determined information for the user task entry.

Figure 6:
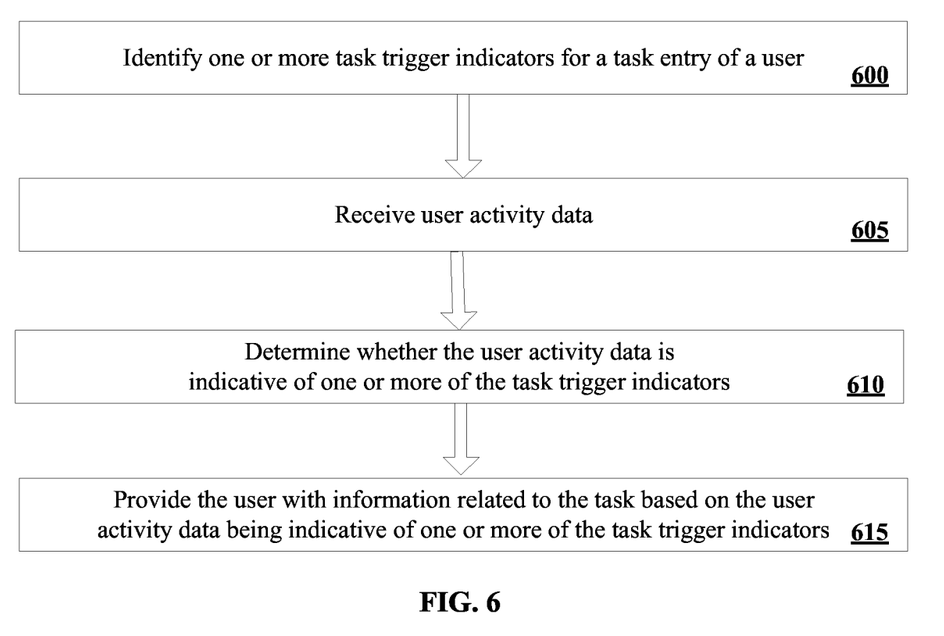
FIG. 6 is a flow chart illustrating an example method of providing a user with information related to a user task entry of the user.

Referring to FIG. 6, a flow chart is illustrated of an example method of providing a user with information related to a user task entry of the user. Other implementations may perform the steps in a different order, omit certain steps, and/or perform different and/or additional steps than those illustrated in FIG. 6. For convenience, aspects of FIG. 6 will be described with reference to one or more components of FIG. 1 that may perform the method such as the task information system 140.

At step 600, one or more task trigger indicators for a task entry of a user are identified. In some implementations, the task trigger indicators are identified from content database 120 by a component that shares one or more characteristics with task information system 140. In some implementations, one or more of the task trigger indicators may be determined based on a user habit entry that is related to the user task entry as described herein. The task trigger indicators identify one or more conditions that indicate it may be desirable to provide information to the user that is related to the user task entry. As described herein, one or more of the conditions of some task trigger indicators may relate to user activities as indicated by received user activity data and one or more of the conditions of some task trigger indicators may relate to other data that is not dependent on user activities (e.g., a trigger indicator based on a date or time).

At step 605, user activity data is received. Received user activity data is indicative of one or more of a location of a computing device of the user and/or user actions via the computing device. In some implementations, the task information system 140 may receive the user activity data. Received user activity data may be provided directly by the computing device 105 and/or by another component with which the computing device 105 communicates (e.g., content database 120 and/or a search system to which the computing device 105 submitted a search query).

At step 610, it is determined whether the user activity data is indicative of one or more of the task trigger indicators. In some implementations, the task information system 140 may determine whether the user activity data is indicative of one or more of the task trigger indicators. As one example, with reference to FIG. 4, task trigger indicators may be determined for the user task entry 122C based on the trigger indicators 1246C1-C4 of the related habit entry 124C. For example, in some implementations the trigger indicators 1246C1-C4 may be utilized as the task trigger indicators. For example, the trigger indicator 1246C2 of "At Work" may identify a condition related to determining the user is likely at work and task information system 140 may determine, based on received user activity data, if the user is likely at work. For example, the task information system 140 may determine the user is likely at work based on received user activity data that indicates location data of a computing device of the user and/or user access of a work computing device. Also, for example, the trigger indicator 1246C4 of "Navigational Search" may identify a condition related to determining one or more search queries issued by the user that are navigational search queries related to a business entity and task information system 140 ma determine, based on received user activity data, if the user has issued a navigational search query related to a business entity. For example, the task information system 140 may determine a navigational search query related to a business entity based on received use activity data that is annotated with information indicating it is navigational and indicating it is directed to a business entity.

As described herein, one or more trigger indicators may optionally be tied to one another. For example, trigger indicators 1246C2 and/or 1246C4 may optionally be tied to temporal indicators 1246C1 and/or 1246C3. For example, the trigger indicator 1246C4 of "Navigational Search" may identify a condition related to determining one or more search queries issued by the user on a weekday and/or between 11:00 A.M. and 1:00 P.M. that are navigational search queries related to a business entity. Also, as described herein, one or more trigger indicators may include one or more conditions that are based on data besides user activity data. For example, the trigger indicator 1246C1 of "Weekday" may identify a condition of it being a week day and the trigger indicator 1246C3 of "Between 11:00 A.M. and 1:00 P.M." may identify a condition related to it being between the hours of 11:00 A.M. and 1:00 P.M..

At step 615, the user is provided with information related to the task based on the user activity data being indicative of one or more of the task trigger indicators. In some implementations, task information system 140 may provide information related to the user task entry when the conditions associated with one or more task trigger indicators have been satisfied. As described herein, the conditions of one or more of the task trigger indicators may be based on other data besides user activity data.

As one example, continuing with the previous example, task information system 140 may provide information related to the user task entry 122C when all of the conditions associated with one or more trigger indicators have been satisfied. For example, if it is a weekday between the hours of 11:00 A.M. and 1:00 P.M., and user activity data indicates the user is at work and has issued a navigational search related to a business entity, information related to the user task entry 122C may be provided. In some implementations, the task information system 140 may provide information related to the user task entry 122C when the conditions associated with less than all of the trigger indicators have been satisfied.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 926 and a file storage subsystem 928, user interface input devices 922, user interface output devices 920, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform one or more of the steps of FIG. 5 and/or FIG. 6.

These software modules are generally executed by processor 914 alone or in combination with other processors. Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, comprising:
  receiving user interface input provided at a task entry interface of a task application executing on a computing device of a user, the user interface input indicating:
    a task action to be performed, and
    a task interaction entity with which the user will interact in performing the task action;
  determining that a habit entry for the user has a threshold degree of similarity to the task entry, wherein the habit entry is based on past user task entries provided by the user at the task application, and wherein determining that the habit entry has the threshold degree of similarity to the task entry is based on comparing the task action and/or the task interaction entity to the habit entry;
  in response to determining that the habit entry for the user has the threshold degree of similarity with the task entry:
    selecting a trigger indicator of the habit entry, the trigger indicator based on the past user task entries and specifying one or more location conditions or one or more temporal conditions;
  in response to selecting the trigger indicator of the habit entry, providing the trigger indicator, for presentation at a display of the computing device, as a suggested trigger indicator for the task entry;
  receiving, in response to providing the trigger indicator for presentation, further user interface input that affirmatively selects the trigger indicator for the task entry; and
  in response to receiving the further user interface input that affirmatively selects the trigger indicator for the task entry, assigning the trigger indicator to the task entry;
  subsequent to assigning the trigger indicator to the task entry, and in response to determining that data generated by the computing device or an additional computing device of the user satisfies the one or more location conditions or the one or more temporal conditions:
    providing, for presentation to the user via the computing device or the additional computing device, a notification related to the task entry, the notification recommending the user perform the task action with the task interaction entity of the task entry.

2. The method of claim 1, wherein the trigger indicator specifies the one or more location conditions and wherein providing the notification related to the task entry is in response to determining that the data satisfies the one or more location conditions.

3. The method of claim 1, wherein the trigger indicator specifies the one or more temporal conditions and wherein providing the notification related to the task entry is in response to determining that the data satisfies the one or more temporal conditions.

4. The method of claim 1, wherein determining that the habit entry has the threshold degree of similarity to the task entry is based on comparing the task action to the habit entry and is based on comparing the task interaction entity to the habit entry.

5. The method of claim 1, wherein determining that the habit entry has the threshold degree of similarity to the task entry is based on comparing the task action to the habit entry.

6. The method of claim 1, wherein determining that the habit entry has the threshold degree of similarity to the task entry is based on comparing the task interaction entity to the habit entry.

7. The method of claim 1, further comprising:
  providing, for presentation simultaneously with the trigger indicator, an alternative trigger indicator option that is selectable to set an alternative trigger indicator for the task entry.

8. The method of claim 1, wherein the notification includes a selectable portion that, when selected, causes automatic performance of the task action.

9. The method of claim 8, wherein automatic performance of the task action comprise automatically dialing a phone number, for the task interaction entity, using a phone dialing application of the computing device or the additional computing device.

10. The method of claim 1, wherein the notification includes a selectable portion that, when selected, causes automatic population, of information for the task interaction entity, in an application that enables performance of the task action.

11. The method of claim 10, wherein the information is a phone number and wherein the application is a phone dialing application.

12. A system, comprising:
memory storing instructions;
one or more hardware processors executing the instructions to:
 receive user interface input provided at a task entry interface of a task application, the user interface input indicating:
  a task action to be performed, and
  a task interaction entity with which the user will interact in performing the task action;
 determine, based on comparing the task action and/or the task interaction entity to the habit entry, that a habit entry for the user has a threshold degree of similarity to the task entry,
  wherein the habit entry is based on past user task entries provided by the user at the task application;
 in response to determining that the habit entry for the user has the threshold degree of similarity with the task entry:
  select a trigger indicator, of the habit entry, that is based on the past user task entries and that specifies one or more location conditions or one or more temporal conditions;
 in response to selecting the trigger indicator of the habit entry, provide the trigger indicator, for presentation at a display, as a suggested trigger indicator for the task entry;
 receive, in response to providing the trigger indicator for presentation, further user interface input that affirmatively selects the trigger indicator for the task entry; and
 in response to receiving the further user interface input that affirmatively selects the trigger indicator for the task entry, assign the trigger indicator to the task entry;
 subsequent to assigning the trigger indicator to the task entry, and in response to determining that data for the user satisfies the one or more location conditions or the one or more temporal conditions:
  provide, for presentation to the user, a notification related to the task entry, the notification recommending the user perform the task action with the task interaction entity of the task entry.

13. The system of claim 12, wherein the trigger indicator specifies the one or more location conditions and wherein providing the notification related to the task entry is in response to determining that the data satisfies the one or more location conditions.

14. The system of claim 12, wherein the trigger indicator specifies the one or more temporal conditions and wherein providing the notification related to the task entry is in response to determining that the data satisfies the one or more temporal conditions.

15. The system of claim 12, wherein determining that the habit entry has the threshold degree of similarity to the task entry is based on comparing the task action to the habit entry and is based on comparing the task interaction entity to the habit entry.

16. The system of claim 12, wherein, in executing the instructions, one or more of the hardware processors are further to:
 provide, for presentation simultaneously with the trigger indicator, an alternative trigger indicator option that is selectable to set an alternative trigger indicator for the task entry.

17. The system of claim 12, wherein the notification includes a selectable portion that, when selected, causes automatic performance of the task action.

18. The system of claim 17, wherein automatic performance of the task action comprise automatically dialing a phone number, for the task interaction entity, using a phone dialing application of the computing device or the additional computing device.

19. The system of claim 12, wherein the notification includes a selectable portion that, when selected, causes automatic population, of information for the task interaction entity, in an application that enables performance of the task action.

20. The system of claim 12, wherein the information is a phone number and wherein the application is a phone dialing application.

* * * * *